(12) United States Patent
Boneberg et al.

(10) Patent No.: US 7,413,820 B2
(45) Date of Patent: Aug. 19, 2008

(54) FUEL CELL SYSTEM WITH RECOMBINER

(75) Inventors: Stefan Boneberg, Beuren (DE); Bernd Monzel, Denkendorf (DE); Thomas Stark, Kirchheim (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 891 days.

(21) Appl. No.: 10/269,933

(22) Filed: Oct. 11, 2002

(65) Prior Publication Data

US 2003/0082428 A1    May 1, 2003

(30) Foreign Application Priority Data

Oct. 11, 2001  (DE) .................. 101 50 385

(51) Int. Cl.
*H01M 8/04*    (2006.01)

(52) U.S. Cl. .............. 429/12; 429/24; 429/26; 429/34

(58) Field of Classification Search ................ 429/12, 429/13, 17, 19, 20, 24, 26, 34
See application file for complete search history.

(56) References Cited

U.S. PATENT DOCUMENTS

| | | | |
|---|---|---|---|
| 4,735,872 A * | 4/1988 | Maimoni | 429/27 |
| 5,429,885 A * | 7/1995 | Stockburger et al. | 429/13 |
| 6,500,576 B1 * | 12/2002 | Davis et al. | 429/27 |
| 6,746,789 B1 * | 6/2004 | Chen et al. | 429/19 |
| 2003/0175572 A1 * | 9/2003 | Bette et al. | 429/34 |
| 2004/0053085 A1 * | 3/2004 | Smedley et al. | 429/19 |

FOREIGN PATENT DOCUMENTS

| | | |
|---|---|---|
| DE | 198 52 951 A1 | 5/2000 |
| DE | 100 01 717 C1 | 4/2001 |
| DE | 100 31 238 A1 | 1/2002 |
| EP | 442042 A2 * | 8/1991 |

OTHER PUBLICATIONS

Ledjeff, K. et al., "Self-Limiting Catalytic Hydrogen/Oxygen Recombiner," *Journal of Power Sources 8*, pp. 211-227, 1982.

* cited by examiner

*Primary Examiner*—Stephen J. Kalafut
(74) *Attorney, Agent, or Firm*—Crowell & Moring LLP

(57) ABSTRACT

A fuel cell system, which may include a fuel processing subsystem for converting hydrocarbons into a hydrogen-rich gas, is designed so that at least some of the components of the fuel cell system are contained inside at least one housing. The housing contains a recombiner to convert hydrogen and oxygen into water. The housing may also contain a temperature sensor in the vicinity of the recombiner.

14 Claims, 1 Drawing Sheet

FUEL CELL SYSTEM WITH RECOMBINER

CROSS-REFERENCE TO RELATED APPLICATION

This application claims priority to German Patent Application No. 10150385.7 filed Oct. 11, 2001, which application is incorporated herein by reference in its entirety.

BACKGROUND OF THE INVENTION

1. Field of Invention

The invention relates to a fuel cell system, which may further include a fuel processing subsystem for converting hydrocarbons into a hydrogen-rich gas, whereby components of the fuel cell system are arranged in at least one housing.

2. Description of the Related Art

A fuel cell system, in particular one that is equipped with a fuel processing subsystem for converting hydrocarbons into a hydrogen-rich gas, is often enclosed in a housing which is suitable for isolating it from the surrounding environment. As a result, in the event of a leak originating from the fuel processing subsystem, the fuel cell or any of the conduits, the leaked fluid (e.g., the hydrogen-rich gas) will accumulate within the volume of the housing. Typically, there are small accumulations of hydrogen in the housing, as hydrogen leaks cannot in most cases be entirely prevented, hydrogen being a permeating gas.

German Patent Application DE 100 31 238 discloses a fuel cell system and a method for operating the fuel cell system. The fuel cell system is equipped with a ventilated housing, whereby fans, designed so as not to constitute an ignition source, are used as ventilating means. The ventilated housing addresses the potential safety hazard, which can be posed by the accumulation of explosive mixtures, such as hydrogen and oxygen, within the fuel cell system environment. German Patent DE 100 01 717 further discloses a fuel cell system where flow amplifiers are used in various locations of the fuel cell system to address the safety hazard posed by hydrogen accumulation.

The article entitled "Self-limiting Catalytic Hydrogen/Oxygen Recombiner" (Journal of Power Sources, Vol. 8, pages 211-227, 1982) discloses the use of recombiners in lead storage battery applications. The recombiners are used to convert the gases produced by the chemical reaction within the battery—typically hydrogen and oxygen—into water. As a result, the water-refill requirement for lead storage batteries equipped with such recombiners is considerably reduced. Recombiners typically comprise the following components: acid separator, carbon filter, catalyst, condenser, gas storage, and valves. German Patent Application DE 198 52 951 A1 similarly discloses use of recombiners to catalytically convert hydrogen and oxygen into water, but in the context of nuclear power plant technology, where recombiners are used in the processing of escaped gases resulting from accidents in boiling water reactors and pressurized water reactors.

Accordingly, there while advances have been made in this field, there remains a need for systems to address potential accumulation of reactive mixtures, such as hydrogen and oxygen mixtures, within the fuel cell system environment, particularly within the housing that encloses such system. The present invention fulfills this need and provides further related advantages.

BRIEF SUMMARY OF THE INVENTION

The present invention provides a fuel cell system comprising a housing for containing leaked fluids originating from at least one component of the fuel cell system, and a recombiner for converting the leaked fluids into a non-explosive mixture or material. Pursuant to one embodiment, the recombiner catalytically converts hydrogen and oxygen into water. The fuel cell system may further include a fuel processing subsystem. Some or all of the fuel cell system components may be contained within the housing.

The recombiner may be thermally connected to a component of the fuel cell system that rapidly reaches operating temperature during cold-start or to a heat sink within the system. The recombiner may further comprise a catalyst coating applied on an interior surface of the housing.

The fuel cell system may further comprise a fan positioned within the housing for directing the leaked fluids towards the recombiner. Preferably, the fan is designed so as not to constitute an ignition source.

The fuel cell system may further comprise a temperature sensor positioned in the vicinity of the recombiner to provide an indication of how much hydrogen is present in the housing and/or of rate of increase in hydrogen concentration within the housing, based on the temperature increase resulting from the exothermic reaction at the recombiner.

The fuel cell system may further comprise a control unit for adjusting or shutting down operation of the fuel cell system when a threshold temperature is detected by the temperature sensor and/or when a threshold temperature rate increase is detected by the temperature sensor.

Many specific details of certain embodiments of the invention are set forth in the detailed description below to provide a thorough understanding of such embodiments. One skilled in the art, however, will understand that the present invention may have additional embodiments, or may be practiced without several of the details described.

BRIEF DESCRIPTION OF THE DRAWING(S)

DETAILED DESCRIPTION OF THE INVENTION

Figure 1:
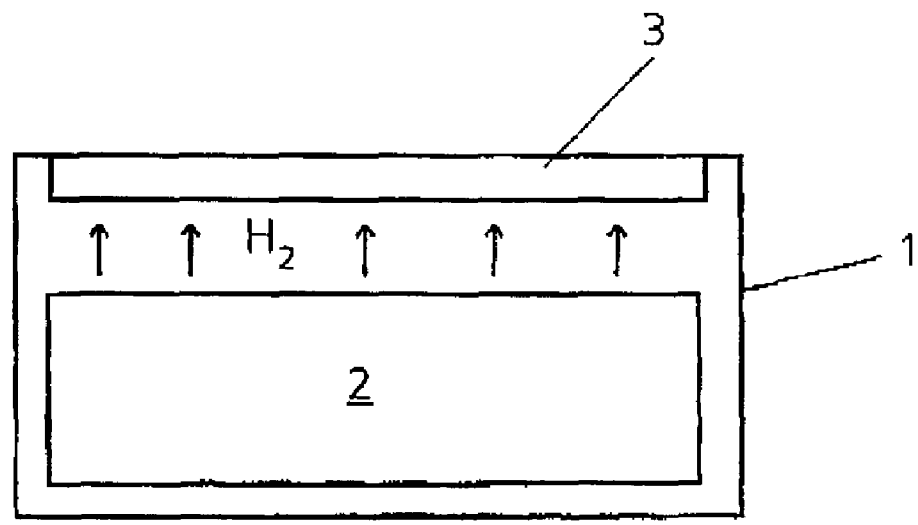
FIG. 1 is a schematic representation of a fuel cell system, enclosed in a housing with a recombiner, according to an embodiment of the invention.
Figure 2:
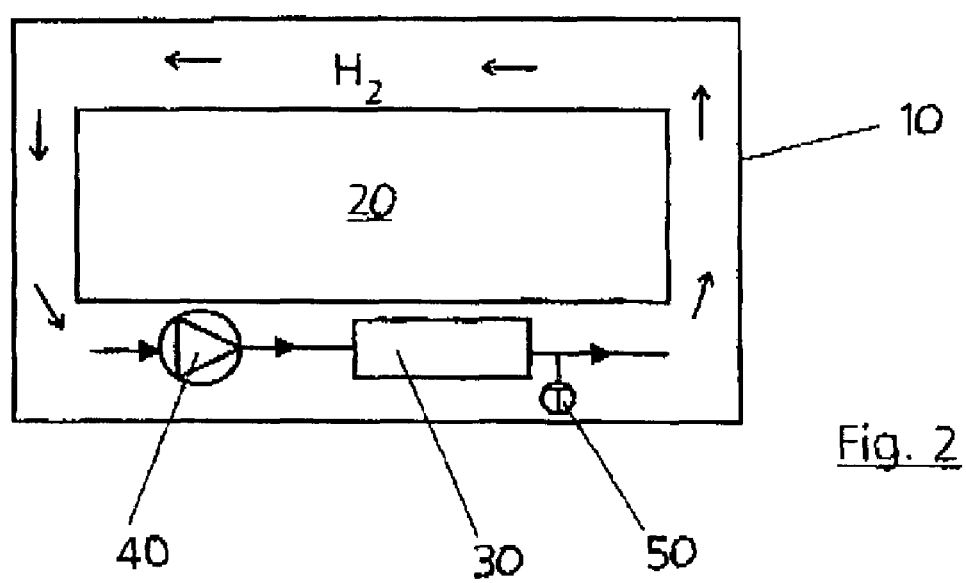
FIG. 2 is a schematic representation of a fuel cell system, enclosed in a housing with a recombiner, according to an alternate embodiment of the invention.

Referring to FIGS. 1 and 2, and for purposes of illustration, only the fuel processing subsystem (2 or 20) of a fuel cell system is schematically represented as being enclosed within the housing (1 or 10), as the fuel processing subsystem is a typical and thus representative source of leaked fluids. The housing (1 or 10) may be configured to enclose an entire fuel cell system (which may or may not have a fuel processing subsystem) or one or more components thereof. The housing may also be one of several housings, each enclosing particular components of a fuel cell system. Depending on the component being housed, the housing may further include a recombiner. As these configurations make use of the principles disclosed herein, such configurations are not separately illustrated and described below. Fuel cell systems may be used for motor vehicle applications, for example in the propulsion of the a motor vehicle.

In FIG. 1, housing 1 encloses fuel processing subsystem 2 such that substances leaking out of fuel processing subsystem 2, more specifically hydrogen, are contained within its confines and do not reach the surrounding environment. Because of hydrogen's small molecular size, minor hydrogen leaks are typically difficult to prevent during normal operation. Some leaked hydrogen therefore tends to accumulate in housing 1 where, together with the air already present, it forms a hydrogen/oxygen mixture that is converted into water by recombiner 3.

Housing 1 provides mechanical protection for fuel processing subsystem 2. Housing 1 is also sufficiently sealed to isolate such subsystem from the surrounding environment. Housing 1 may be designed with a specified gas-tightness requirement, for example a requirement that the leak rate be less than $1 \cdot 10^{-7}$ mbar·l/s, but may also be designed with a poorer gas-tightness requirement, so long as housing 1 adequately protects its content against mechanical damage, provides electrical and/or thermal insulation, and provides splash-proof protection, as appropriate for the application in which it is being used.

The sealed configuration of housing 1 requires no active ventilation. Active ventilation has the disadvantage of potentially cooling fuel processing subsystem 2 during operation, which is often not desired. Active ventilation also has the disadvantage of potentially introducing impurities from the surroundings, such as salt and humidity, into the interior of housing 1, which may could lead to problems related to corrosion, electrical problems, and other similar problems. Both of these disadvantages are addressed by the present system.

Should there be an active ventilation requirement, it is minimal, since it only has to ensure that there is always a sufficient amount of oxygen present within housing 1 for the recombination of the leaked hydrogen to occur. The small quantities of air, or of any other oxygen-rich gas, required to be supplied to housing 1 for this purpose may, for example, originate in the fuel cell system's air supply.

Within recombiner 3, which in the illustrated embodiment may be a catalytic recombiner with a platinum and/or palladium base, the leaked hydrogen accumulating within housing 1 is catalytically recombined with the oxygen, contained in the air that is present within housing 1, to form water. Such water is then subsequently drained off in a conventional manner without affecting the sealing characteristics of housing 1.

Recombiner 3 is therefore used to prevent an increase of hydrogen concentration within the interior of housing 1 and thus prevent the formation of an explosive mixture. The result is a safer operation of fuel processing subsystem 2 and, consequently, of the entire fuel cell system.

There are various ways to position recombiner 3 within housing 1. For example, recombiner 3 may comprise a catalyst coated on an interior portion of the housing 1, for example on the underside of the housing cover. Alternatively, such catalyst may be applied onto an appropriate support material, for example a wire mesh, which may then be attached to the interior of the housing or the underside of the housing cover, for example by gluing the support material to the cover. An advantage of using a catalytic coating is that it can be applied to an end plate or to the cover of housing 1 using well-known coating processes (for example, dipping or spraying processes), so that the desired effect can be accomplished using manufacturing processes of low complexity.

In the embodiment illustrated in FIG. 1, hydrogen leaking from fuel processing subsystem 2 reaches recombiner 3 through diffusion and/or convection, as shown by arrows.

In an especially practical embodiment, recombiner 3 is positioned in a heat sink area, so that the thermal energy, which is produced when hydrogen and oxygen are exothermically catalytically converted to water, can be buffered and dissipated. This mitigates the risk of damage to the catalyst caused by overheating.

Alternatively, recombiner 3 may be thermally coupled to one of the components of fuel processing subsystem 2. More specifically, a component that rapidly reaches operating temperature during cold-start could be chosen such as, for example, a catalytic oxidation stage or a partial oxidation stage. Consequently, recombiner 3 can rapidly reach operating temperature, thereby ensuring reliable recombination of potentially leaking hydrogen at a very early stage of the operation of fuel processing subsystem 2.

FIG. 2 is a schematic representation of an alternate embodiment of the invention as applied to a fuel cell system of a similar design to FIG. 1, having a housing 10 and a fuel processing subsystem 20.

As in the previous embodiment, a certain amount of leakage or permeation of hydrogen may occur, so that hydrogen accumulates within housing 10. This embodiment however, does not rely on the leaked hydrogen reaching recombiner 30 by convection and/or diffusion. Instead, gas within housing 10 is circulated (as represented by arrows) by means of a fan 40. Fan 40 is preferably a fan or ventilator designed so as not to constitute an ignition source, so that safety is not compromised were an explosive hydrogen/oxygen mixture to be present within housing 10. Fan 40 directs gas within the housing to recombiner 30.

In this alternate embodiment, recombiner 30 may be a monolithic catalyst, a metallic fabric coated with catalyst, a catalytic plate reactor, or other similar device. Alternatively, recombiner 30 may be a coating of a type described previously; in which case fan 40 may be designed to direct the gas mixture past the particular area of fuel processing subsystem 20 or of housing 10 which is coated with recombiner catalyst.

FIG. 2 also shows a temperature sensor 50 in the vicinity of recombiner 30. This temperature sensor 50 is used to detect temperature fluctuations in the vicinity of recombiner 30.

Due to the relationship between the amount of hydrogen being converted at recombiner 30 and the temperature in the vicinity of the recombiner, it becomes possible to specify a threshold temperature that corresponds to a specific hydrogen content of the gas within housing 10. This threshold value may correspond to a hydrogen concentration in housing 10 that is not to be exceeded for safety reasons, and above this threshold operation of the system may be adjusted or shut down.

This embodiment consequently provides a safety-monitoring device, which may be linked to a fuel cell system shutdown procedure and/or to a fuel processing subsystem 20 shutdown procedure. Instead of standard hydrogen sensors, which are comparatively more complicated and expensive, more susceptible to faults and exhibit a very high cross sensitivity to carbon dioxide and water vapour, a simple and inexpensive temperature sensor in the vicinity of recombiner 30 can be used to detect how much hydrogen is present in housing 10 (by detecting how much hydrogen is being converted in the vicinity of recombiner 30).

Temperature sensor 50 is also a good indicator of whether a sudden hydrogen leak has occurred within housing 10. Indeed, any large quantity of hydrogen discharged within housing 10, due to a fault, a broken pipe or the like, would subsequently be converted by recombiner 30. The related rapid temperature increase in the vicinity of recombiner 30 is indicative of such a sudden hydrogen leak in the system.

Consequently, a system shutdown may be triggered in response to the temperature rising above a threshold value and/or in response to the rate of temperature increase exceeding a threshold value.

While particular elements, embodiments and applications of the present apparatus have been shown and described herein, it will be understood, of course, that the invention is not limited thereto since modifications may be made by those skilled in the art, particularly in light of the foregoing teachings. It is therefore contemplated by the appended claims to cover such modifications as incorporating those features that come within the scope of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A fuel cell system comprising:
   a housing capable of containing leaked fluids originating from a component of the fuel cell system;
   a recombiner that is disposed in said housing, and is capable of converting the leaked fluids into a non-explosive mixture; and
   at least one other component of the fuel cell system;
   wherein the recombiner comprises a catalyst coating applied on an interior surface of the housing.

2. The fuel cell system of claim 1, further comprising a fan positioned within the housing for directing the leaked fluids towards the recombiner.

3. A fuel cell system comprising:
   a housing capable of containing leaked fluids originating from a component of the fuel cell system;
   a recombiner that is disposed in said housing, and is capable of converting the leaked fluids into a non-explosive mixture; and
   at least one other component of the fuel cell system;
   wherein the recombiner is thermally connected to receive a flow of heat from a component of the fuel cell system that reaches operating temperature during cold-start.

4. The fuel cell system of claim 3 further comprising a fuel processing subsystem, wherein the recombiner is thermally connected to at least one component of the fuel processing subsystem of the fuel cell system.

5. A fuel cell system comprising:
   a housing capable of containing leaked fluids originating from a component of the fuel cell system;
   a recombiner that is disposed in said housing, and is capable of converting the leaked fluids into a non-explosive mixture;
   at least one other component of the fuel cell system; and
   means for determining a hydrogen concentration in a gas mixture in said container;
   wherein said means for determining a hydrogen concentration comprises a temperature sensor positioned in said gas flow in said container; and
   wherein said fuel cell system further comprises a control unit for adjusting operation of the fuel cell system in response to the temperature detected by the temperature sensor.

6. The fuel cell system of claim 5, wherein said control unit shuts down operation of the fuel cell system when a threshold temperature is detected by the temperature sensor.

7. The fuel cell system of claim 5, wherein said control unit adjusts operation of the fuel cell system in response to a temperature rate increase detected by the temperature sensor.

8. The fuel cell system of claim 5, wherein said control unit shuts down operation of the fuel cell system when a threshold temperature rate increase is detected by the temperature sensor.

9. A motor vehicle comprising the fuel cell system of claim 5.

10. A fuel cell system comprising:
    a housing capable of containing leaked fluids originating from a component of the fuel cell system;
    a recombiner that is disposed in said housing, and is capable of converting the leaked fluids into a non-explosive mixture; and
    at least one other component of the fuel cell system;
    a temperature sensor positioned in said housing; and
    a control unit for adjusting operation of the fuel cell system in response to the temperature detected by the temperature sensor.

11. The fuel cell system of claim 10, further comprising a control unit for shutting down operation of the fuel cell system when a threshold temperature is detected by the temperature sensor.

12. The fuel cell system of claim 10, further comprising a control unit for adjusting operation of the fuel cell system in response to a temperature rate increase detected by the temperature sensor.

13. The fuel cell system of claim 10, further comprising a control unit for shutting down operation of the fuel cell system when a threshold temperature rate increase is detected by a temperature sensor.

14. A motor vehicle comprising the fuel cell system of claim 10.

* * * * *